Feb. 19, 1924.
H. S. RECTOR
1,484,559
LUGGAGE CARRIER FOR BICYCLES
Filed Aug. 8, 1921    2 Sheets-Sheet 1
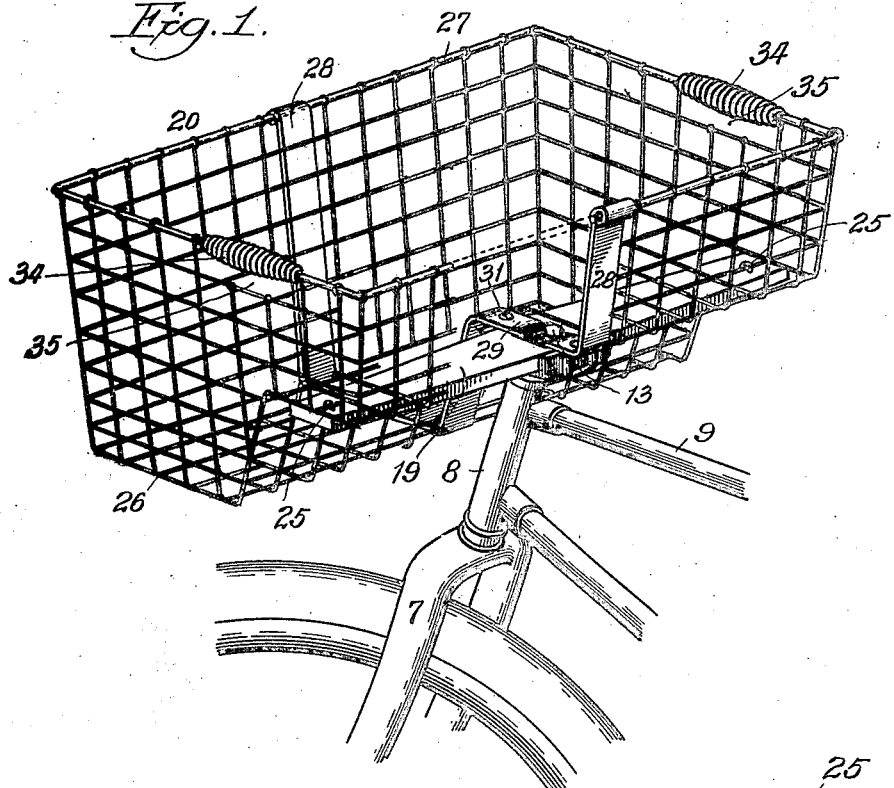
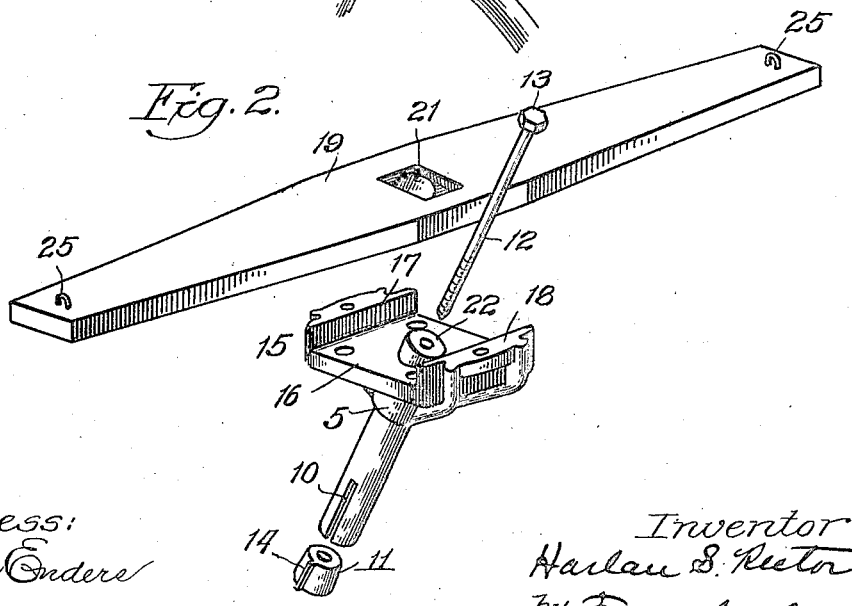
Witness:
John Endere
Inventor:
Harlan S. Rector
by Fred Gerlach
his Atty.

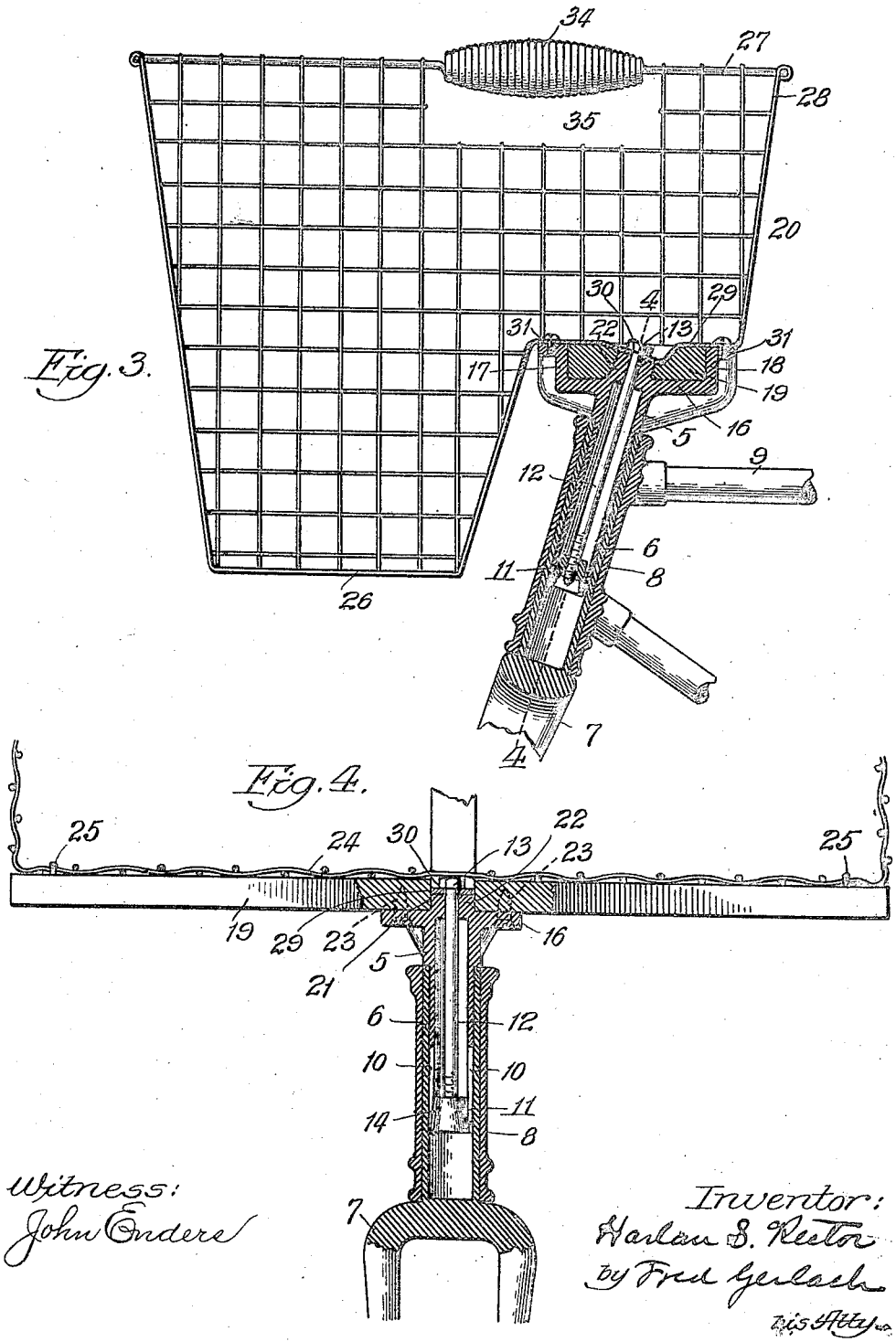

Patented Feb. 19, 1924.

1,484,559

UNITED STATES PATENT OFFICE.

HARLAN S. RECTOR, OF CHICAGO, ILLINOIS, ASSIGNOR TO THE BECKLEY-RALSTON CO., OF CHICAGO, ILLINOIS, A CORPORATION OF ILLINOIS.

LUGGAGE CARRIER FOR BICYCLES.

Application filed August 8, 1921. Serial No. 490,509.

*To all whom it may concern:*

Be it known that I, HARLAN S. RECTOR, a citizen of the United States, and a resident of Chicago, in the county of Cook and State of Illinois, have invented certain new and useful Improvements in Luggage Carriers for Bicycles, of which the following is a full, clear, and exact description.

The invention relates to luggage carriers for bicycles. One object of the invention is to provide an improved luggage carrier which is well secured to, and directly supported from, the stem in the steering column. Another object of the invention is to combine the luggage carrier or basket and the steering handles, so that the ordinary handle bar may be dispensed with.

The invention consists in the several novel features hereinafter set forth and more particularly defined by claims at the conclusion hereof.

In the drawings: Fig. 1 is a perspective of the invention. Fig. 2 is a perspective of the stem adapted to be secured in the steering column, the supporting bar and the securing means for the stem, the parts being disassembled for illustrative purposes. Fig. 3 is a vertical section. Fig. 4 is a section on line 4—4 of Fig. 3.

The invention is exemplified in connection with a stem 5 which is adapted to fit in the column 6, to the lower end of which the steering fork 7 is attached. The column 6 is rotatably held in the head 8 secured to the bicycle frame 9, as well understood in the art. The stem 5 is hollow and its lower portion is split, as at 10, to render it expansible by a wedge 11 which is operable by a bolt 12, to which the expander wedge is threaded, as well understood in the art. A head 13 is provided at the upper end of the bolt 12 to operate the expander wedge and the latter is provided with a rib 14 extending into one of the slits 10 to hold it against rotation with the bolt.

The upper end of the stem is provided with a bracket 15 which comprises a bottom-wall 16 and front and rear walls 17 and 18, forming, in effect, a transversely extending recess for a wooden cross-bar 19 which is adapted to serve as a transverse support for a luggage basket 20. The central portion of the cross-bar 19 is formed to fit snugly between the front and rear walls 18 and on the bottom wall 16 and is provided with an opening 21 to receive an upwardly extending lug 22 through which the bolt 12 extends. The cross-bar is secured to the bracket 15 which is integral with the stem 5 by screws 23.

The luggage basket 20 is formed of interlaced wires and comprises a portion 24 which extends over and overlies the cross bar 19 and is secured thereto by staples 25. In front of the cross-bar, the basket is provided with a depending portion 26 to increase the capacity of the basket. The top of the basket is usually open and its rim is formed of a strip of stout wire 27 which extends around the front, rear and sides thereof. The central portion of the basket is reinforced by a flat strip of metal 28 which has its ends lapped around the rim wire 27 and is provided with a portion 29 which fits snugly over the cross-bar 19 and is provided with a hole 30 through which the expander bolt 12 passes, so that the strip will be rigidly clamped to the cross-bar 19 by the bolt-head 13. The strip is further secured by screws 31 which are threaded into the walls 17 and 18 of the bracket 15 and extends along the rear wall, thence over cross-bar 19, thence downwardly to the bottom portion 26 and thence upwardly to the rim wire to form a central reinforcement for the basket. The handles 34, which may be formed by coiling the rim-wire 27, are provided at the sides of the basket and, by reason of the connection of the basket with the stem 5, these handles are used to steer the bicycle. Openings 35, through which the fingers may pass in gripping the handles 34, are formed in the basket sides below the handles.

The invention exemplifies a luggage carrier or basket which is rigidly and effectively secured to the stem which is secured in the steering column and which is provided with handles so that the space above the steering column becomes available as holding space in the basket. By providing handles on the basket, the necessity of providing the usual bar and securing the carrier to the handle bar is avoided. The cross-bar is specially adapted for supporting the basket and to have the basket rigidly secured thereto. The expander bolt is utilized to assist in securing the basket in place and is accessible for adjustment from the inside of the basket, so that the stem may be easily adjusted or removed. The basket may be detached from the bracket and stem when the expander bolt is withdrawn and by removal of the screws 30. The basket may have considerable carrying capacity without interfering with the steering of the bicycle.

The invention is not to be understood as restricted to the details set forth, since these may be modified within the scope of the appended claims, without departing from the spirit and scope of the invention.

Having thus described the invetnion, what I claim as new and desire to secure by Letters Patent, is:

1. The combination of a stem adapted to be secured to a steering column, a supporting cross-bar fixedly secured to the upper portion of the stem and a basket having a depressed portion over and overlying and secured to the cross-bar, a portion extending below the cross-bar and sides at the ends of both portions of said basket.

2. The combination of a stem adapted to be secured to a steering column, a supporting cross-bar fixedly secured to the upper portion of the stem and a basket having a portion extending over and overlying and secured to the cross-bar and a portion extending below the cross-bar, and provided with steering handles.

3. The combination of a stem adapted to be secured to a steering column and provided with a recessed bracket, a cross-bar rigidly secured in said recess, a basket overlying the cross-bar and provided with steering handles, means for securing the cross-bar to the stem, and means for securing the basket directly to the stem.

4. The combination of a stem adapted to be secured to a steering column and provided with a bracket, a supporting bar secured in said bracket, a basket provided with an open-work bottom and with a transverse extending reinforcing strip extending crosswise and over said bar and bracket and secured to the bracket, and steering handles on the basket.

5. The combination of a stem adapted to be secured to a steering column, a basket provided with a reinforcing strip, and a bolt for securing the stem in a steering column extending through said strip and adapted to secure it to said stem.

6. The combination of a stem adapted to be secured to a steering column, a bracket on the upper end of the stem, a cross-bar secured in said bracket, a basket secured on said cross-bar, the basket being provided with a reinforcing strip overlying the cross-bar and a bolt for securing the stem in a steering column and extending through the strip to clamp it to the stem.

7. The combination of a stem adapted to be secured to a steering column, and provided with a bracket having a transverse recess therein, a transverse supporting bar secured in said recess, a basket extending over the transverse supporting bar and secured thereon and steering handles on the basket, the bar being provided with a recess, and means for securing the stem in the steering column in said recess.

HARLAN S. RECTOR.